Jan. 20, 1959
F. S. BRAINARD, SR
2,869,963
RATE RECORDER FOR INTEGRATING METERS
Filed Feb. 1, 1956
3 Sheets-Sheet 3
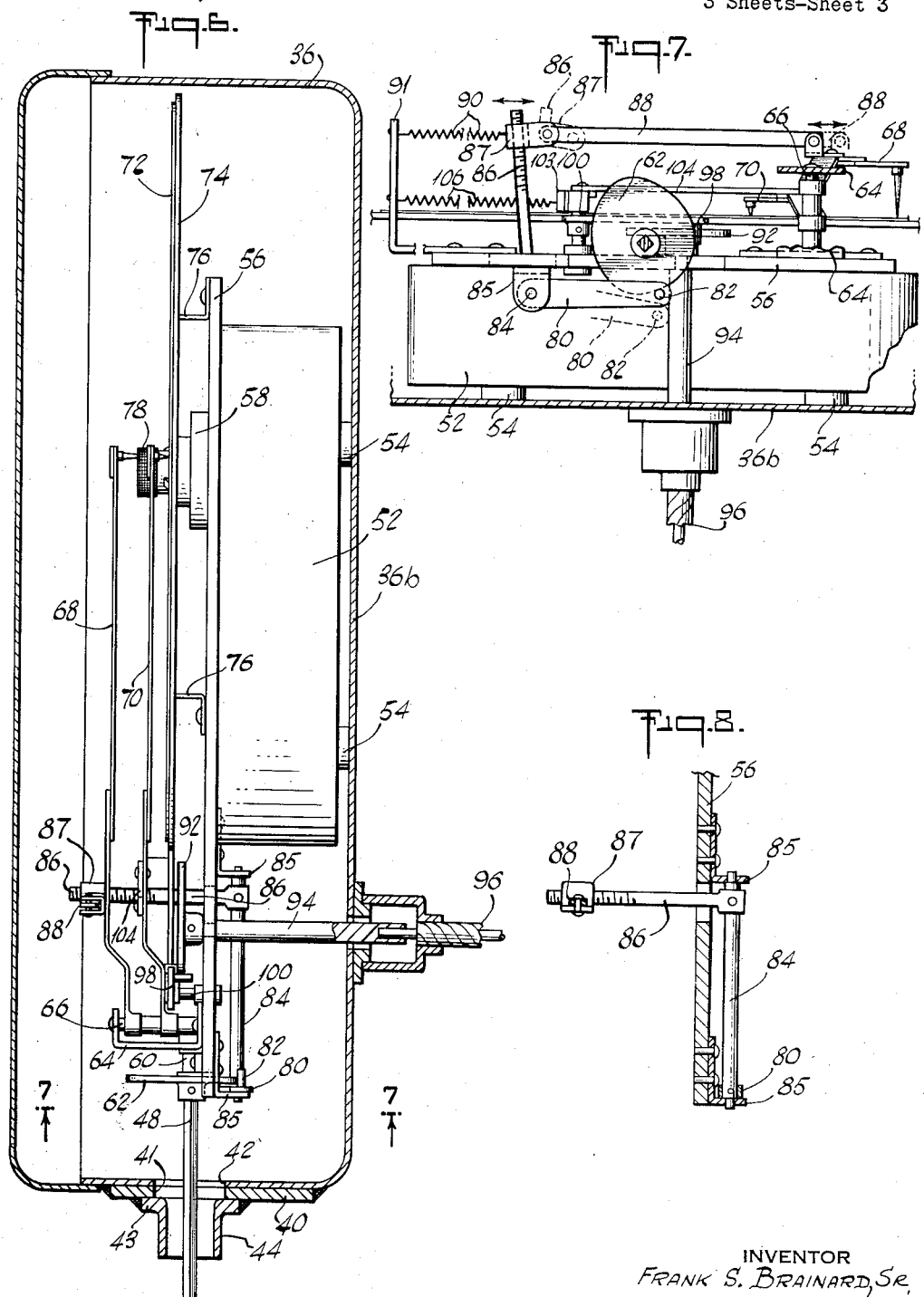
INVENTOR
FRANK S. BRAINARD, SR.
BY
Eyre, Mann & Burrows
ATTORNEYS United States Patent Office 2,869,963
Patented Jan. 20, 1959

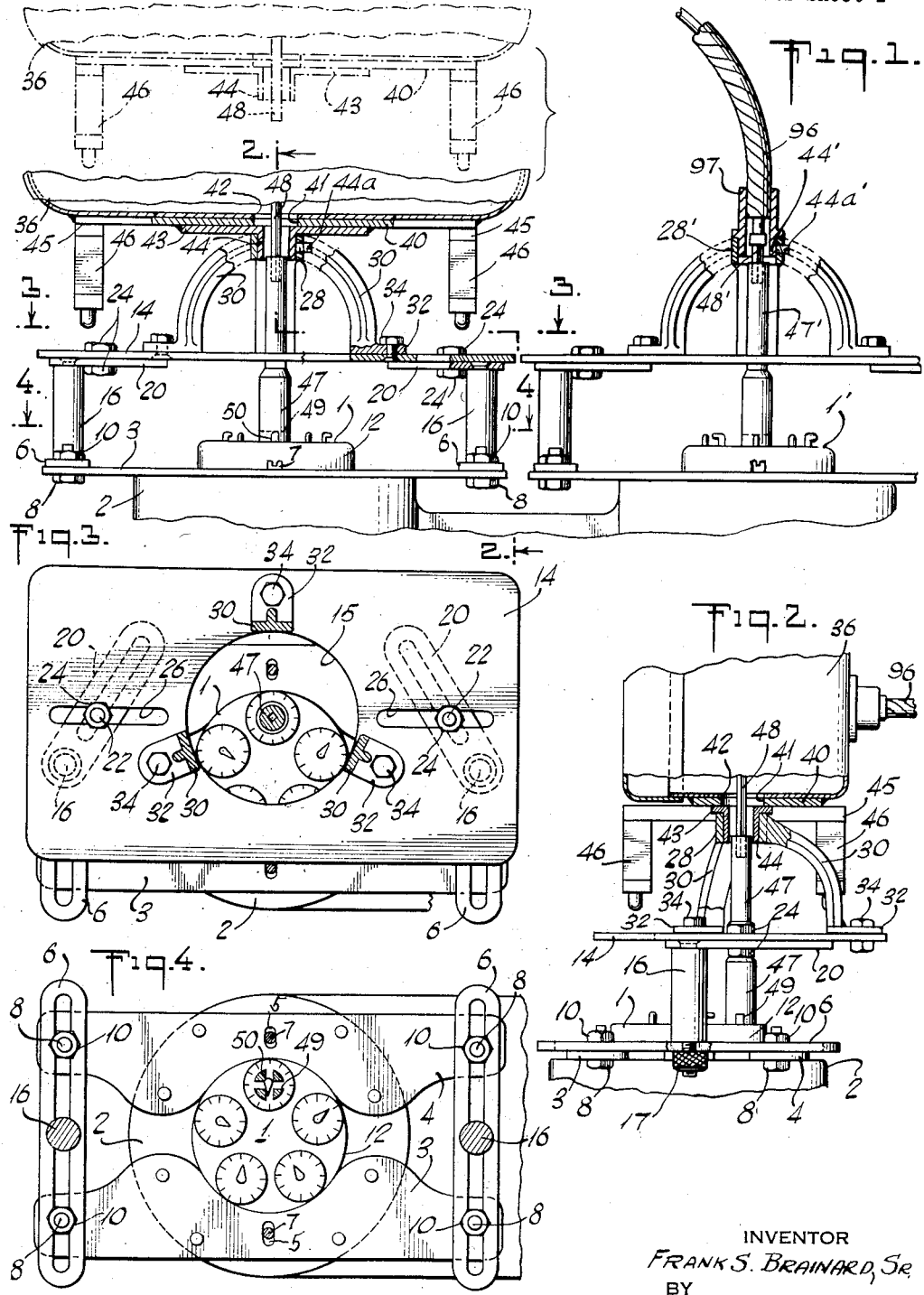

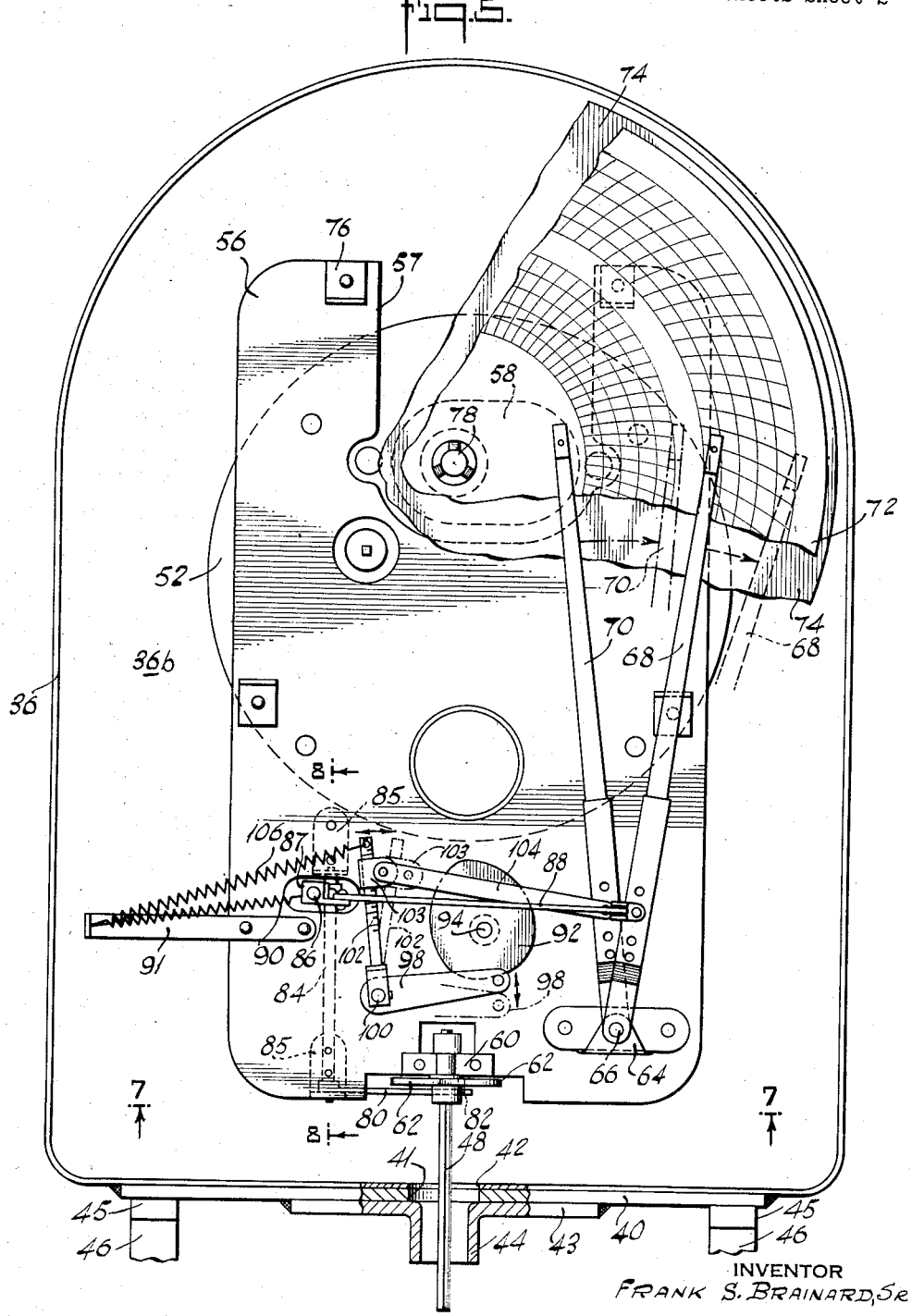

2,869,963

RATE RECORDER FOR INTEGRATING METERS

Frank S. Brainard, Sr., Hartford, Conn.

Application February 1, 1956, Serial No. 562,738

3 Claims. (Cl. 346—14)

The present invention relates to rate recorders for integrating meters such as water meters and comprises a portable recorder for such meters which is light in weight, easy to install and yields a rate record of the water or other fluid measured by the integrating meter without interfering with the normal functioning thereof. The rate recorder of the present invention is of the general type of that disclosed and claimed in my prior Patent No. 2,057,228, dated October 13, 1936 but is an improvement thereover in that it is more sturdy and compact, simpler to install and of fewer parts.

Briefly, the new rate recorder comprises a clockwork mechanism of conventional type adapted to drive a chart upon which rate records are to be made, recording stylii mounted for cooperation with the chart, cams for deflecting the stylii in accordance with the rates of rotation of the cams, adjustable means for rigidly mounting the clockwork mechanism and parts associated therewith on an integrating meter and means coupling the cams to pointers or "hands" of a meter for converting pointer rotations to stylus movements.

A feature of the new recorder is the adjustable mounting bracket and plate which permits the recorder portion of the attachment to be mounted on a meter over the clock thereof with the drive shaft of one of the cams aligned with the axis of rotation of any one of the meter pointers.

Another, and an important, feature of the invention is the means whereby a record from both sides of a compound meter can be obtained on the same chart with the chart disposed in a vertical plane and with the two cams for operating the pens disposed in mutually perpendicular planes.

Other features of the invention will become apparent as the description proceeds.

For a better understanding of the invention reference may be had to the accompanying drawings of which:

Fig. 1 is a front view, partly in section of the rate recorder mounting means of the invention;

Fig. 2 is a section taken on the line 2—2 of Fig. 1;

Figs. 3 and 4 are horizontal sectional views taken on the lines 3—3 and 4—4 respectively of Fig. 1;

Fig. 5 is a front view, partly broken away of the recording mechanism of the invention;

Fig. 6 is a side view of the mechanism of Fig. 5, the side wall of the casing being omitted;

Fig. 7 is a horizontal sectional view taken on the line 7—7 of Figs. 5 and 6 and showing the coupling between a pen arm and cam; and Fig. 8 is a detail of the coupling means of Fig. 7.

The rate recorder illustrated in the drawings is adapted to be mounted directly upon an integrating meter such as a water meter employed for measuring the amount of water delivered to the consumers. Such meters are of relatively standardized construction. Each comprises a casing of generally circular cross section within which is housed the mechanism for driving the pointers, usually at least six, of the meter. The pointers and their co-operating dials are positioned beneath a removable cover, ordinarily of transparent material, at the top of the casing and the casing adjacent the upper end thereof is provided with a shoulder or flange. In Figs. 1 to 4 the upper end or register of such an integrating meter is shown at 1 and the shoulder or flange of the meter casing is shown at 2. It is upon the shoulder 2 of such conventional integrating meter that the rate recorder of the present invention is adapted to be mounted in any desired position.

The mounting means include a mounting bracket comprising flat cross members 3 and 4 interconnected at their ends by slotted links 6. Each cross member 3 and 4 is coupled at its ends to the links 6 by means of bolts 8 which pass through holes in the cross member and through the slots in the links. Nuts 10 threaded to the bolts 8 lock the cross pieces to the links. The links 6 are long enough to permit the cross members 3 and 4 to span the casing of the largest meter for which a rate recorder would be desired. Each cross member 3 and 4 is cut away through an arcuate portion near the mid section thereof to provide a curved edge for clearance of the casing wall 12 of the integrating meter. The cross members 3 and 4 are each provided with a slot 5 for reception of a meter covered screw 7. A mounting plate 14, provided with a central aperture 15 of substantially the area of a meter clock, is supported above the mounting bracket by means of two posts 16 each of which has a reduced lower threaded end which passes through the slot in one or the other of the cross links 6 and is locked thereto by a knurled nut 17. The upper ends of the posts 16 are fixed to longitudinally slotted arms 20 upon which the mounting plate 14 rests and to which it is secured by means of bolts 22 and nuts 24, the bolts 22 passing through slots 26 in the mounting plate (see Fig. 3). With this arrangement loosening of nuts 24 and of nuts 17 permits the mounting plate 14 to be moved with respect to the mounting bracket and clock face 1 of the meter to bring the center of the aperture 15 directly over the axis of any one of the pointers of the clock face. Loosening of the nuts 10 permit the side members 3 and 4 to be moved toward or away from each other to install the bracket on the meter with the slots 5 positioned for reception of the cover screw 7.

An instrument support casting comprising a ring 28 and three arcuate legs 30 terminating in horizontal feet 32 is so mounted on the plate 14 by means of bolts 34 passing through aligned holes in the feet 32 and plate 14 that the axis of the ring 28 is substantially in alignment with the center of aperture 15 in plate 14. It is upon this casting that the instrument casing 36 containing the recording mechanism is supported when a rate recording is to be made.

The casing 36 has welded to its lower surface a bar or plate 40 having a centrally disposed aperture 41 therein aligned with an opening 42 in the casing. Welded to the underside of plate 40 by means of flanges 43 is a collar member 44 of external diameter such as to fit within the ring 28 of the instrument support casting, the axis of collar 44 coinciding with the axis of aperture 41. After the collar member 44 is inserted into the ring 28 and the casing 36 oriented as desired, the parts may be locked against relative rotation by a set screw 44a threaded through the wall of collar 28 and engageable at its inner end with the collar member. Preferably, to permit the instrument case with its contents to be independently supported when desired cross bars 45 secured to the underside of the plate 40 carry four depending legs 46. It is through the openings 41 and 42, collar 44 and ring 28 that the coupling between the mechanism within the casing and a pointer of the meter register is made, the coupling comprising a member 47 having a longitudinal bore in its upper end of square cross section for sliding fit with a cam shaft 48 of square cross section and an enlarged lower end provided with a pair of mutually perpendicular intercepting transverse passages 49 and 50 (see Fig. 4). When the lower end of the member 47 is placed over the axis of rotation of a pointer on the register 1, the pointer is received in one or the other of the passages 49 or 50 and, therefore, when the pointer rotates it engages a wall of a passage and transmits its motion to the member 47 which in turn causes rotation of the shaft 48.

The mechanism within the casing 36 will now be described with reference to Figs. 5 through 8. A clock timer mechanism 52 of conventional construction is fixedly mounted, as by studs 54, to the rear wall 36b of the casing and on the front face of the clock mechanism is secured a plate 56. The plate 56 has a generally U-shaped opening 57 along its upper end for clearance of the gear change mechanism 58 of the clock mechanism. At the lower end of the plate 56 is a bearing support 60 for the upper end of the cam shaft 48. A heart shaped cam 62 is mounted on the shaft 48 to be rotated from the selected register pointer of the meter the rate of which is to be recorded. A bracket 64 is mounted on the lower end of the plate 56 and this bracket carries the horizontal shaft 66 about which pivot pen arms 68 and 70. The upper end of each pen arm carries a suitable pen for engagement with a chart 72 driven by the clock mechanism 52. The chart 72 is disposed against and rotated upon a chart disc 74 supported from the plate 56 by brackets 76. The rotation of the chart is effected by means of the shaft 78 of the timer mechanism which penetrates a central hole in the chart and is locked thereto by means of the lock ordinarily provided in such timer mechanism. Preferably the charts to be used in the mechanism of the present invention are of the general type described in my Patent No. 2,057,228.

Pen arm 68 is oscillated through a given arc, that defined by the full line and broken line positions of the arm shown in Fig. 5, in accordance with the rotation of cam 62. A cam arm 80 carries at its free end a follower roll 82 and is fixed at its other end to a rock shaft 84 mounted in bearings 85 on the rear surface of the plate 56 below the clock mechanism 52. A threaded multiplier arm 86 is fixed at one end to the upper end of shaft 84 and threaded on its other end is a cap 87 which is pivotally connected to one end of a link 88. The other end of link 88 is pivotally connected to the pen arm 68 at a point spaced from the shaft 66. A tension spring 90 has one end secured to the cap 87 and its other end secured to one arm of an L-shaped bracket 91 the other arm of which is riveted or otherwise secured to the plate 56. Thus rotation of the cam 62 in a horizontal plane oscillates the shaft 84 through the intermediary of the cam arm 80 and oscillation of the shaft 84 through the multiplying arm 86 is converted into a rocking of the pen arm 68 through the intermediary of the link 88. Spring 90 serves to maintain the cam follower in engagement with the cam and biases the pen arm toward the central portion of the chart.

In order that simultaneous records can be made of rotation of pointers of different registers, for example, of compound meters, means are provided within the casing 36 for driving the pen arm 70 from a cam 92 which is mounted on a horizontal shaft 94 extending out through the rear wall 36b of the casing. Shaft 94 is coupled to one end of the core of a flexible cable 96. The other end of the sheath of cable 96 has a tubular attachment 97 secured thereto which is formed with a sleeve 44' dimensioned like sleeve 44. The other end of the core of the cable has fixed thereto a short shaft 48' of rectangular cross section dimensioned like shaft 48. Thus, when the second register 1' of a compound meter is provided with an adjustable structure comprising a mounting bracket, support plate and support casting duplicating the structure already described for supporting the casing 36, the sleeve 44' of the tubular attachment 97 of the cable sheath can be fixed within the ring 28' of the second support casting by a set screw 44a' and the shaft 48' coupled to a pointer of register 1' by a tubular member 47' in the same manner as member 47 couples a pointer of register 1 to shaft 48. Cam 92 is thus rotated by a pointer of register 1' selected in accordance with the position to which the support structure is adjusted.

The coupling between cam 92 and pen arm 70 includes a cam arm 98 carrying a cam follower at one end and fixed at its other end to a stub shaft 100. Also fixed to shaft 100 to be rocked thereby is one end of a multiplier arm 102, the movable element 103 near the other end thereof being pivotally connected to one end of a link 104. Link 104, at its other end is pivotally connected to pen arm 70 at a point spaced from shaft 66. A tension spring 106, connected at one end to the end of arm 102 and at its other end to the bracket 91 maintains the cam follower in engagement with cam 92. Thus although the cams 62 and 92 are positioned for rotation about mutually perpendicular axes the coupling therefrom to the pen arm is such as to oscillate the respective pen arms about the same horizontal axis.

The invention has now been described with reference to one specific embodiment thereof. It will be apparent that the new construction provides a mounting bracket which can be readily applied to meters of various sizes, which permits ready adjustment into position for recording the rate of any one of the pointers of a meter register, which requires no tools to adjust and which interferes in no way with the operation of the meter. The mounting of the instrument support casting on the bracket supported on the flange of the meter casing permits the casting to be readily rotated about the meter casing to position the recorder with reference to any one of the register pointers. The adjustable connections between the mounting plate and mounting bracket afford additional means for facilitating proper orientation of the recorder so that all adjustments can be made prior to the positioning upon the instrument support casting of the casing containing the recording mechanism. When the plate has been positioned so as to locate the axis of ring 28 in the casting over the desired pointer, the coupling member 47 may then be positioned over the selected pointer before the casing of the recorder is positioned upon the casting. During the positioning of the recorder casing the shaft 48 of cam 62 is introduced into the upper end of the member 47. The flexible cable 96 may then be employed to drive cam 92 from any other desired pointer of a neighboring register. The instrument is then ready for making a simultaneous record of the rates of rotation of the two selected pointers.

The following is claimed:

1. A rate recorder for integrating meters of the type having a register including at least one meter driven shaft, said recorder comprising a mounting bracket adapted to be releasably secured about a meter to span the register thereof, a mounting plate having an aperture therein, adjustable means for mounting said plate on said bracket with the center of said aperture aligned with the axis of rotation of a meter driven shaft, a casing enclosing chart driving mechanism, recording means and at least one cam the rotation of which controls movement of a recording means, means on said mounting plate for supporting said casing with the axis of rotation of said cam aligned with the center of said aperture, and coupling means effective when said casing is supported by said means to drive said cam from the meter driven shaft aligned with the center of said aperture, said recording means including a pen arm oscillatable about an axis perpendicular to the axis of rotation of said cam, the means for converting rotation of said cam into oscillation of said pen arm comprising a rock shaft disposed parallel to the axis of rotation of the cam, a cam arm fixed at one end to said shaft and carrying at its other end a cam follower engaging said cam, a multiplying arm fixed at one end to said rock shaft to be oscillated thereby, and a link coupling the multiplying arm with said pen arm.

2. A rate recorder for integrating meters of the type having a register including at least one meter driven shaft, said recorder comprising a mounting bracket adapted to be releasably secured about a meter to span the register thereof, a mounting plate having an aperture therein, adjustable means for mounting said plate on said bracket with the center of said aperture aligned with the axis of rotation of a meter driven shaft, a casing enclosing chart driving mechanism, recording means and a cam the rotation of which controls movement of a recording means, means on said mounting plate for supporting said casing with the axis of rotation of said cam aligned with the center of said aperture, and coupling means effective when said casing is supported by said means to drive said cam from the meter driven shaft aligned with the center of said aperture, recording means including two pen arms oscillatable about a common axis perpendicular to the axis of rotation of said cam, said casing including also a second cam rotatable about an axis parallel to the axis about which said pen arms are oscillatable, means including a flexible shaft for driving said second cam from a driven shaft of another integrating meter register, means for converting rotation of said first mentioned cam into oscillation of one of said pen arms, and means for converting rotation of the second cam into oscillation of the other of said pen arms, whereby the rates of two different driven shafts can be simultaneously recorded.

3. The combination with an integrating meter of the type having a register, including a plurality of meter driven shafts, mounted at one end of a casing of generally circular cross section and provided with an annular shoulder, of a rate recorder and means for mounting the recorder on the casing in operative relation to a meter driven shaft of the register, said mounting means including an adjustable bracket adapted to rest upon the shoulder of the casing and clear the register, upright rigid members carried by the bracket, a mounting plate carried by said members and having a reference point thereon for alignment with a meter driven shaft, telescoping means for coupling a meter driven shaft to a movable element of the recorder when the recorder is supported on said plate in predetermined relation to said reference point, said coupling means serving to transmit rotary motion of said meter driven shaft to said element, said means on said plate for supporting the recorder comprising a casting have a ring portion and arcuate spaced legs adapted to be secured to the plate to support the ring portion in spaced relation thereto, said recorder being adapted to seat in said ring portion with the shaft of said movable element extending therethrough.

References Cited in the file of this patent

UNITED STATES PATENTS

| | | |
|---|---|---|
| 1,816,995 | Armstrong et al. | Aug. 4, 1931 |
| 2,057,228 | Brainard | Oct. 13, 1936 |
| 2,085,224 | Krueger | June 29, 1937 |
| 2,524,299 | Sutherland | Oct. 3, 1950 |
| 2,757,062 | Hood | July 31, 1956 |